US010062008B2

(12) United States Patent
Heusch et al.

(10) Patent No.: US 10,062,008 B2
(45) Date of Patent: Aug. 28, 2018

(54) IMAGE BASED OBJECT CLASSIFICATION

(71) Applicant: SICPA HOLDING SA, Prilly (CH)

(72) Inventors: Guillaume Heusch, Lausanne (CH); Nicolas Pican, Montreux (CH)

(73) Assignee: SICPA HOLDING SA, Prilly (CH)

( * ) Notice: Subject to any disclaimer, the term of this patent is extended or adjusted under 35 U.S.C. 154(b) by 13 days.

(21) Appl. No.: 14/897,916

(22) PCT Filed: Jun. 13, 2013

(86) PCT No.: PCT/EP2013/062230
§ 371 (c)(1),
(2) Date: Dec. 11, 2015

(87) PCT Pub. No.: WO2014/198315
PCT Pub. Date: Dec. 18, 2014

(65) Prior Publication Data
US 2016/0110630 A1    Apr. 21, 2016

(51) Int. Cl.
*G06K 9/00* (2006.01)
*G06K 9/62* (2006.01)
(Continued)

(52) U.S. Cl.
CPC ............ *G06K 9/6255* (2013.01); *G06K 9/46* (2013.01); *G06K 9/626* (2013.01); *G06K 9/628* (2013.01);
(Continued)

(58) Field of Classification Search
CPC ........ G06K 9/46; G06K 9/6255; G06K 9/626; G06K 9/6265; G06K 9/6269;
(Continued)

(56) References Cited

U.S. PATENT DOCUMENTS

2002/0158599 A1* 10/2002 Fujita ................ B25J 13/003
                                                        318/568.11
2010/0014762 A1*  1/2010 Renders ............. G06K 9/6277
                                                        382/224
(Continued)

FOREIGN PATENT DOCUMENTS

WO     2009/118583    10/2009

OTHER PUBLICATIONS

C. Harris et al., "A Combined Corner and Edge Detector", Alvey Vision Conference, 1988.
(Continued)

*Primary Examiner* — Li Liu
(74) *Attorney, Agent, or Firm* — Muncy, Geissler, Olds & Lowe, P.C.

(57) ABSTRACT

A method for classifying an object in image data to one out of a set of classes using a classifier, said image data comprising an image of the object, each class indicating a property common to a group of objects, the method comprising the steps of obtaining said classifier used to estimate for an input feature vector a probability for each of the set of classes, one probability indicating whether the input feature vector belongs to one class; extracting a feature vector from said image data; using the obtained classifier to estimate the probabilities for the extracted feature vector; and evaluating the estimated probabilities for determining whether the object does not belong to any one of the set of classes based using a quality indicator.

12 Claims, 6 Drawing Sheets

(51) Int. Cl.
*G06T 7/00* (2017.01)
*G06K 9/46* (2006.01)

(52) U.S. Cl.
CPC ......... *G06K 9/6265* (2013.01); *G06K 9/6269* (2013.01); *G06K 9/6277* (2013.01); *G06K 9/6285* (2013.01); *G06T 7/0004* (2013.01); *G06T 2207/30164* (2013.01)

(58) Field of Classification Search
CPC .... G06K 9/6277; G06K 9/628; G06K 9/6285; G06K 9/00536; G06K 9/6262; G06T 2207/30164; G06T 7/0004
See application file for complete search history.

(56) References Cited

U.S. PATENT DOCUMENTS

| | | | |
|---|---|---|---|
| 2011/0093109 A1 | 4/2011 | Budzinski et al. | |
| 2011/0235900 A1* | 9/2011 | Porikli | G06K 9/622 382/159 |
| 2012/0301015 A1* | 11/2012 | Tanase | G06F 17/3025 382/159 |
| 2013/0222696 A1* | 8/2013 | Yamazaki | G06K 9/6219 348/571 |
| 2014/0247978 A1* | 9/2014 | Devin | G06K 9/6262 382/159 |
| 2014/0294239 A1* | 10/2014 | Duckett | G06K 9/6228 382/103 |
| 2014/0314271 A1* | 10/2014 | Xu | G06K 9/00369 382/103 |

OTHER PUBLICATIONS

E. Nowak et al., "Sampling Strategies for Bag-of-Features Image Classification", European Conference on Computer Vision, 2006.
M. Agrawal et al., "CenSurE: Center Surround Extremas for Realtime Feature Detection and Matching", European Conference on Computer Vision, 2008.
T. Tuytelaars, "Dense Interest Points", Intl. Conf. on Computer Vision and Pattern Recognition, 2010.
J. Matas et al., "Robust Wide Baseline Stereo From Maximally Stable Extremal Regions", British Machine Vision Conference, 2002.
K. van de Sande et al., "Evaluating Color Descriptors for Object and Scene Recognition", IEEE Trans. on Pattern Analysis and Machine Intelligence, 2010.
M. Calonder et al., "Brief: Binary Robust Independent Elementary Features ", European Conference on Computer Vision , 2010.
C. Cortes et al., "Support-Vector Networks", Machine Learning, 20, 1995.
K. Duan et al., "Which is the best multiclass SVM method? An empirical study", Workshop on Multiple Classifier Systems, 2005.
K. Crammer et al., "On the Algorithmic Implementation of Multi-class SVMs", Journal of Machine Learning Research , 2001.
T. F. Wu et al., "Probability estimates for multi-class classification by pairwise coupling". Journal of Machine Learning Research, 2004.
Giorgio Fumera: "Advanced Methods for Pattern Recognition with Reject Option", Doctoral thesis at the University of Cagliari , Italy, Nov. 1, 2001 (Nov. 1, 2001), pp. 1-84, XP055094016, Cagliari , Italy Retrieved from the Internet: URL:http://www.diee.unica.it/DRIEI/tesi/14_fumera.pdf.
Bernhard Schlkopf et al., "Learning with Kernels: Support Vector Machines, Regularization, Optimization, and Beyond", Jan. 1, 2001 (Jan. 1, 2001), The MIT Press, XP002720776, ISBN: 0262194759 pp. 211-214, p. 211.
Milgram et al., "Estimating accurate multi -class probabilities with support vector machines", Neural Networks, 2005. Proceedings. 2005 IEEE International Joint Conference on Montreal, Que., Canada Jul. 31-Aug. 4, 2005, Piscataway, NJ, USA,IEEE, US, vol. 3, Jul. 31, 2005 (Jul. 31, 2005), pp. 1906-1911, XP010868679, DOI : 10.1109/IJCNN.2005.1556171 ISBN: 978-0-7803-9048-5 sect. IV.B.
Bilik I et al: "Minimum Divergence Approaches for Robust Classification of Ground Moving Targets", IEEE Transactions on Aerospace and Electronic Systems, IEEE Service Center, Piscataway, NJ, US, vol. 48, No. 1, Jan. 1, 2012 Jan. 1, 2012), pp. 581-603, XP011433836, ISSN: 0018-9251, DOI : 10.1109/TAES.2012.6129657 sect. V A and B.

* cited by examiner

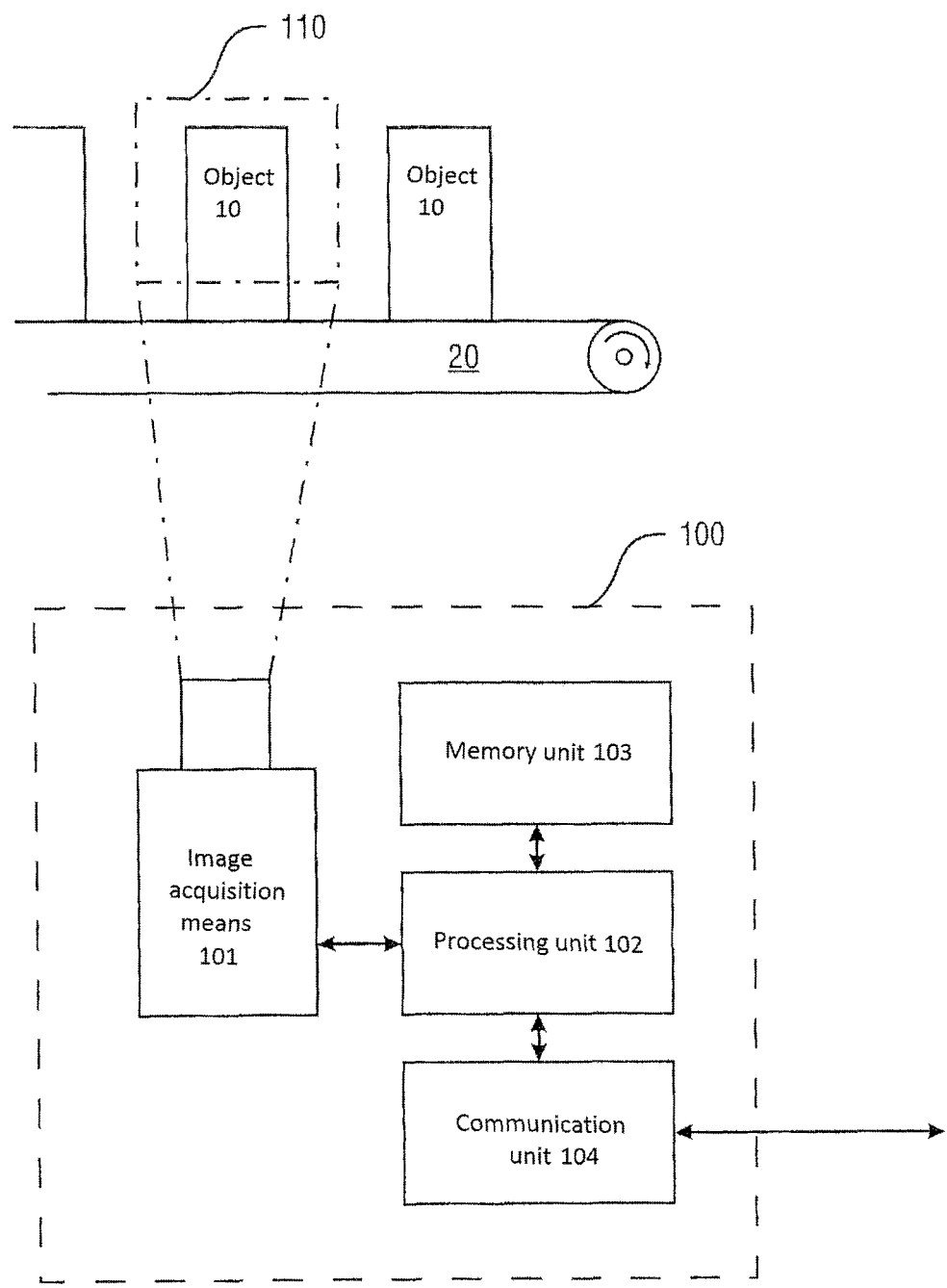

IMAGE BASED OBJECT CLASSIFICATION

TECHNICAL FIELD

The present invention relates to classifying objects in image data. Specifically, the present invention relates to corresponding methods, devices, computer programs, computer program products, and systems. Embodiments of the present invention employ image processing of digital image data of images taken of one or more objects to classify objects to one of a set of classes.

BACKGROUND

Modern manufacturing techniques usually rely on one or more production or packing lines, along which products are moved by means of conveyor belts, guiding rails or related transportation means. The actual manufacturing, production or packing stages usually require some kind of information on objects (e.g. a product) being subject to the respective manufacturing, packaging, inspection or release action.

From the conventional arts, there are known numerous devices and methods for determining a position or orientation of objects on the lines, the type or class of a present object, the presence or absence of objects, counting the number of objects passing a given point along the line, and the like. Common production stages include working on the product for applying or modifying product components, and common packaging stages include wrapping a product, applying product labels, or applying identification marks, such as clear-text identifiers or one- or two-dimensional barcodes.

Also, object inspection may be involved between individual stages, or—for example—at the end of the line as part of quality control and product release. Such inspection may involve determining whether the objects are in a proper shape, e.g. whether the right labels were applied to the products, whether the individual products show indications toward a damaged or incomplete product, and the like. Also for auditing and controlling purposes, inspection may involve gathering information on how many objects of some type (or class) are passing certain points in the line. The latter may be of particular interest if the line processes more than one object class, e.g. different types of products.

The above-mentioned auditing and controlling aspects may be of particular interest when taxable goods are considered. Specific examples for such taxable goods include alcoholic and non-alcoholic drinks (beer, wine, liquor, soft-drinks, etc.) and tobacco products (cigarettes, cigars, loose tobacco, etc.). Fraud in the imports, manufacture and distribution of such goods can cause substantial loss in government revenues. For example, a manufacturer of soft drinks could deliberately mis-declare the true type of a product (i.e. tax class) so that tax liability is reduced. Existing tax collection systems rely on voluntary tax declarations by the manufacturer, which may be difficult to verify.

In the context of the present techniques, examples for objects and products can, however, also include consumer products in general, electronic, electric and non-electric devices, food goods, beverage packs, cans and bottles, cigarette packages and other tobacco products, documents, certificates, money bills and the like. For example, a packaging line fills beverage bottles of different types, so that bottles of different brands and taste move along the same belt or rail.

Conventional devices and systems for obtaining object information along production and packaging lines involve code scanning, such as barcode reading, radio frequency identification (RF-ID) tag reading, mark sensing, laser scanning, light barriers, image processing, and the like. These techniques have different impact onto the general line setup in terms of requirements on the objects (e.g. necessity for barcodes or RF-ID tags), requirements on and modifications to the line equipment (e.g. installation of light sources and sensors, and the like), and requirements on the sensor equipment as such (e.g. power and processing resources).

Further, most of modern production or packing lines are optimized for high product throughput and efficiency. For the former, it is needless to say that line speed, i.e. the speed that the products move along the line or with the belt, and product density, i.e. the spatial and timely distance between two consecutive products appearing at a given position, are certainly important figures in the field of manufacturing and packing. Therefore, it needs to be considered that objects may pass by fast, that the density is high, and that even more than one product/object passes by at the same time.

The large number of such requirements, restrictions, and prerogatives leads to still unsatisfactory performance of conventional object classification in modern manufacturing, production or packing lines. Therefore, there is a need for improved object classification that is reliable, fast and less intrusive to the existing line setup and equipment. Further, in the specific context of taxable goods, an efficient and tamperproof means is needed to verify the correspondence between the declared tax and an actual output of products of a certain class.

SUMMARY

The above mentioned problems are solved by the subject-matter of the independent claims of the present invention. Preferred embodiments are described in the dependent claims.

According to an embodiment of the present invention, a method is provided for classifying an object in image data to one out of a set of classes using a classifier, said image data comprising an image of the object, each class indicating a property common to a group of objects, the method comprising the steps of obtaining said classifier used to estimate for an input feature vector a probability for each of the set of classes, one probability indicating whether the input feature vector belongs to one class; extracting a feature vector from said image data; using the obtained classifier to estimate the probabilities for the extracted feature vector; and evaluating the estimated probabilities for determining whether the object does not belong to any one of the set of classes based using a quality indicator.

According to another embodiment of the present invention, a device is provided for classifying an object in image data, to one of a set of classes using a classifier, said image data comprising an image of the object, each class indicating a property common to a group of objects, the device comprising processing resources being configured to obtain said image data, obtain said classifier used to estimate for an input feature vector a probability for each of the set of classes, one probability indicating whether the input feature vector belongs to one class, extract a feature vector from said image data; use the obtained classifier to estimate the probabilities for the extracted feature vector, and to evaluate the estimated probabilities for determining whether the object does not belong to any one of the set of classes based using a quality indicator.

According to another embodiment of the present invention, a system is provided which comprises a conveyor line arranged for moving objects through a field of view; a device according to any device embodiment of the present invention, and image acquisition means arranged for acquiring the image data comprising an image of said field of view.

According to further embodiments of the present invention, there are provided a computer program that comprises code, which, when executed on a processing resource, implements a method embodiment of the present invention, and a corresponding computer program product.

BRIEF DESCRIPTION OF THE DRAWINGS

Embodiments of the present invention, which are presented for better understanding the inventive concepts but which are not be seen as limiting the invention, will now be described with reference to the Figures in which:

FIG. 1 shows a schematic view of a system setup in a manufacturing, production or packaging line according to an embodiment of the present invention;

DETAILED DESCRIPTION

Figure 2A:
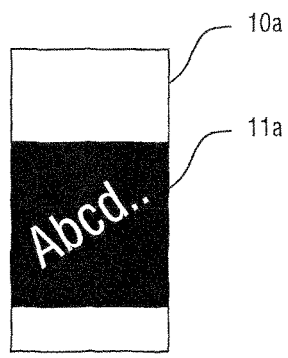
FIGS. 2A to 2C show schematic views of objects belonging to different classes according to embodiments of the present invention.

Although detailed embodiments have been described, these only serve to provide a better understanding of the invention defined by the independent claims, and are not to be seen as limiting.

FIG. 1 shows a schematic view of a system setup in a manufacturing, production or packaging line according to an embodiment of the present invention. FIG. 1 shows objects 10 that are to be classified to one class of a set of classes. An object 10 may be a product of a manufacturing process such as consumer products, food goods, beverage packs, cans and bottles, cigarette packages and other tobacco products, and the like. The objects are conveyed by a conveyor line 20 or any other suitable transporting means along the production line. The conveyor line may be in the form of a belt or any other suitable form for conveying objects.

Furthermore, FIG. 1 shows a device 100 for classifying the objects 10. The device 100 comprises an image acquisition means 101 for taking an image 110 of an object 10. The image may in this way coincide with a so-called field of view 110 of the image acquisition means 101. Such image acquisition means 101 may comprise or may be composed of photodiodes, phototransistors or photoresistance circuits, linear CMOS or CCD sensors, and the like. Further, optics may be employed in the form of a lens or a group of lens.

The device 100 further comprises a processing unit 102 configured to receive image data comprising an image of the object 10 from the image acquisition means 101. The processing unit may be a microprocessor (CPU). The processing unit performs various processing steps on the received image data in line with the disclosed method embodiments. For example, such processing may involve feature vector extraction as described below.

The device 100 may further comprise a communication unit 104 for communicating instructions and data that may be received from other entities, such as servers, controllers and the like. The communication may be effected over a network, such as a local area network (LAN), wireless network (WLAN), the internet, and the like. Further, also bus systems, such as CAN, can be employed for data exchange. The communication unit 104 may also be coupled to the processing unit 102.

The device 100 may further comprise a memory unit 103 coupled to the processing unit 103. The memory unit 103 may store data used for processing image data obtained by the image acquisition means 101.

Figure 2B:
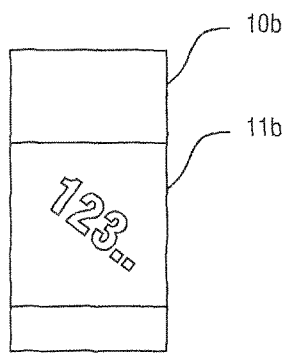
Figure 2C:
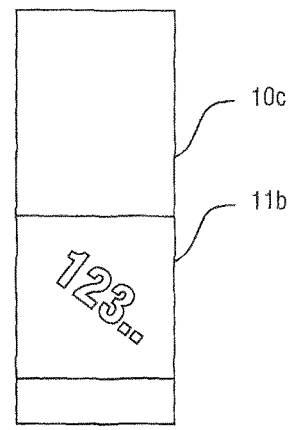

FIGS. 2A to 2C show schematic views of objects belonging to different classes according to embodiments of the present invention. FIG. 2A shows an object 10a to which a label 11a is applied. The label 11a may be applied to the object 10a by attaching a sticker to the object 10a or by printing the label 10a directly onto the object. The label 11a indicates that the object 10a belongs to a certain class of objects. For example, the label 10a may correspond to a specific brand or product type inn that it contains information on the manufacturer or properties of the object 10a. If the object 10a is a beverage container, the label may also provide information on the beverage such as ingredients. Each class indicates a property common to a group of objects. A common property that defines the classes may be a common manufacturer, a common ingredient (e.g. alcohol), or a common shape. Further, any design feature of a label or the object can be identified as a common property. For example, one part of a specific logo as part of a label design may be a common property: Each object showing this part can be classified as belonging to a certain class.

FIG. 2B shows another object 10b to which a label 11b is attached, and FIG. 2C shows another object 10c to which the (same) label 11b is attached. However, despite the same labels, objects 10b and 10c may still belong to different classes due to their size, contents, volume, etc. Especially, the objects 10b and 10c possess different shapes since the object 10c is larger than the object 10b. If objects are also classified based on their respective shape, then objects 10b and 10c can be identified as belonging to different classes.

Figure 3:
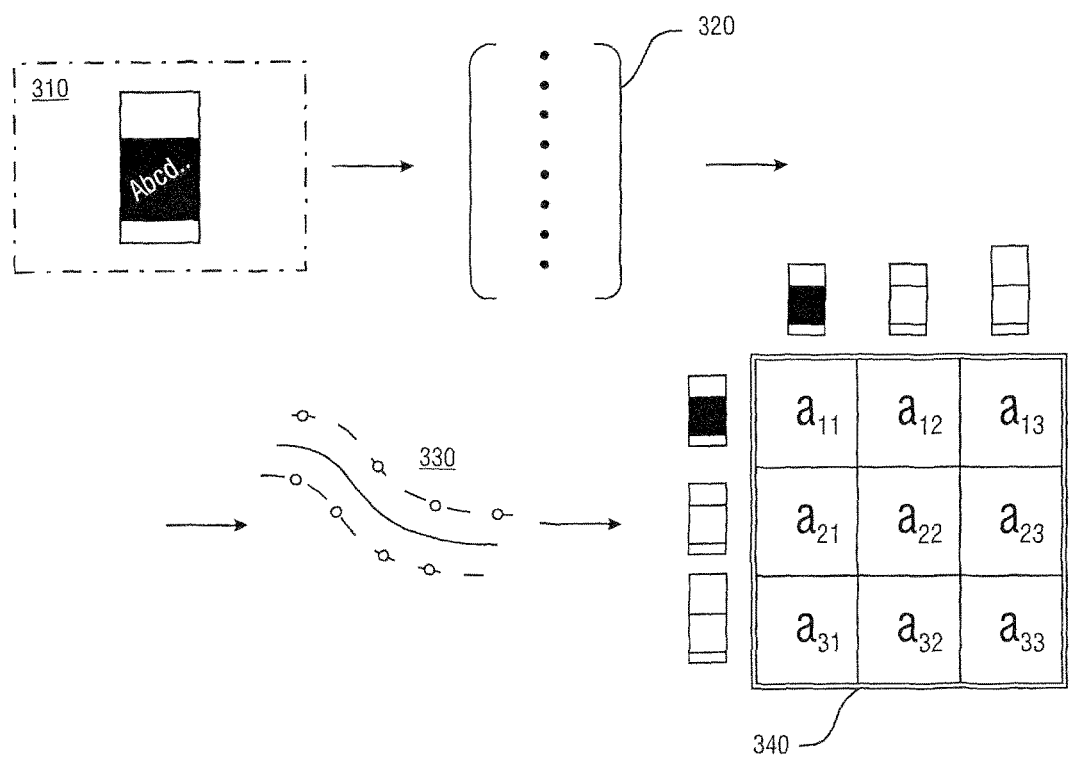
FIG. 3 shows a schematic overview of an embodiment of the present invention.

FIG. 3 shows a schematic overview of an embodiment of the present invention. Especially, this exemplary embodiment relates to an identification system aiming at identifying and classifying products running on a production line. For this purpose, images are acquired by one or two cameras set up on a production line. Then, image processing and machine learning algorithms are used to infer the product's identity and class. Specifically in object recognition, such image processing can be divided into two main operations: first, relevant features are extracted from image data, and second, a machine learning algorithm is used to classify products based on the extracted features. Naturally, the reliability of each operations influences the final accuracy of the system.

In a first step, image data 310 is obtained, for example, by the image acquisition means 101. The image data 310 comprises an image of an object (e.g. the object 10a shown in FIG. 2A). Local features are extracted from the image data 310 and collected in a feature vector 320. In general, the local feature extraction comprises the following steps: selecting interest points, building local descriptors, and forming a feature vector.

Further, the image data 310 may be preprocessed. For example, image data may be resized to a fraction of its original size and pixels values in all three red, green and blue channels can be normalized to mitigate the effect of the illumination conditions. One possible way is described according to the following equations for each pixel i in the image:

$$R'_i = \frac{R_i}{R_i + G_i + B_i}, G'_i = \frac{G_i}{R_i + G_i + B_i}, B'_i = \frac{B_i}{R_i + G_i + B_i}$$

In general, interest point selection can be classified in three main categories: contour-based methods, intensity-based methods, and parametric model based methods. Preferably, the ones based on intensity can be used involving also analyzing the eigenvalues of the Hessian matrix around pixels. Example includes the Harris detector (see for example Harris, C. and Stephens, M. "A Combined Corner and Edge Detector", Alvey Vision Conference, 1988).

In the context of object recognition, however, it can be preferable to use a dense grid or random sampling patches may perform better than considering patches around automatically detected interest points (see for example E. Nowak, F. Jurie and B. Triggs, "Sampling Strategies for Bag-of-Features Image Classification", European Conference on Computer Vision, 2006). Also, the metrics to find interest points are based on generic low level image properties (edges, corners) bearing little direct relationship to the possible discriminative power for visual recognition.

Moreover, in specific settings, objects are viewed at the same scale and hence multi-scale processing may not be necessarily. Also, a hybrid approach, lying between sampling a regular grid and considering only interest points was proposed (see T. Tuytelaars, "Dense Interest Points", Intl. Conf. on Computer Vision and Pattern Recognition, 2010). This approach, referred to as "Dense Interest Points", combines the advantage of having points supposed to contain valuable information while being distributed in every area of the image. In the present embodiments, preferably one of the following three approaches can be used: 1) Automatic keypoints detection, 2) Regular grid, and 3) Dense interest points.

Figure 4A:
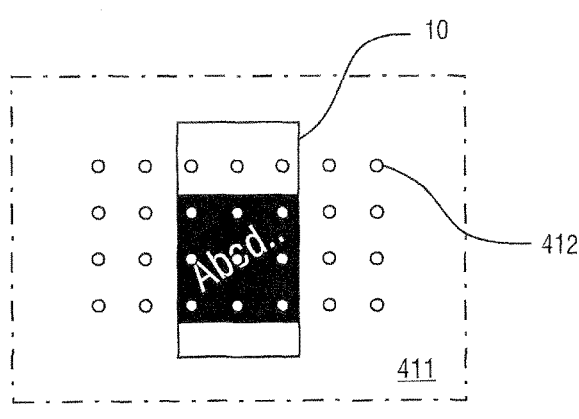
FIGS. 4A to 4D show a further schematic overview of an embodiment of the present invention.

FIG. 4A shows an example a regular grid is employed to select interest points. FIG. 4A shows image data 411 comprising an image of an object 10. A label is attached to the object 10.

A regular grid of points 412 is put on top of the image data 411 in order to define the interest points. Preferably, a more or less dense interest points method can be employed for finding meaningful keypoints (features) in the image. This approach allows for keypoints to be evenly distributed in the image (hence no useful characteristics are missed), while being located on some "interesting" image feature, such as corners or edges. However, in the case of more than one camera (image acquisition means) on the line, automatic interest point detectors can perform better. In this case it can be assumed that most of the useful visual information is located in only one half of the image.

In other words, keypoints can be preferably extracted using the so-called "Dense Interest Points" approach. However, when only a small part of the image contains valuable information, as when e.g. two cameras are used, the automatic keypoint extraction method should be preferred. If speed is a concern, then the simple regular grid should be applied: it is almost instantaneous, with a relatively small loss in the overall accuracy.

Besides the three above mentioned methods to select interest points, there are other known methods that may be employed in the present invention.

One method to select interest points is the so-called center surround extrema which computes an approximation of the Laplacian around each pixel in the image and then finds extrema (see for example M. Agrawal, K. Konolige and M. R. Blas, "CenSurE: Center Surround Extremas for Realtime Feature Detection and Matching", European Conference on Computer Vision, 2008). The advantage of this method is that a relatively coarse approximation to the Laplacian is made thanks to bi-level box filters, which allows a fast implementation using integral images. It may be generally worth considering the processing time needed to extract interest points, above all if the target application is time constrained.

Another method to select interest points is the Maximally Stable Extremal Regions (MSER) approach, in which regions are extracted from an image with a watershed-like segmentation algorithm (see for example J. Matas, O. Chum, M. Urban and T. Pajdla, "Robust Wide Baseline Stereo From Maximally Stable Extremal Regions", British Machine Vision Conference, 2002). Basically, it consists of growing regions within an intensity range. The method hence extracts homogeneous intensity regions which are stable over a wide range of thresholds. Since this algorithm retrieves regions and not interest points directly, the keypoints are extracted as the barycenter of each region.

Also, the number of interest points can be considered. The number of points has been identified as a free parameter when dealing with object recognition. Intuitively, more points should convey more information. However, considering too many interest points could also lead to extract confusing information. It is also noted that in the case of the Bag-of-Words representation, the number of points does not influence the size of the final feature vector. On the contrary, features concatenation does. A good trade-off can be obtained by considering when the difference in performance by adding more points becomes negligible as compared to the overhead in processing time.

According to another embodiment color images are considered. In this case, it can be considered which representation is used to take advantage of this comprehensive color information. Simple RGB values of pixels need not to be the most efficient color representation for object recognition, so that one may compare different encoding of such information. In possible embodiments, one of the following different colorspaces can be used:
1) baseline RGB; 2) rg: the normalized red and green components. The normalization allows this representation to be invariant to light intensity changes, shadows and shading. Note also that b is omitted since b=1−r−g; 3) Opponent: This colorspace is so-called shift-invariant. It means that such a representation should be robust to object highlights and interreflections for instance (see for example K. van de Sande, T. Gevers and C. Snoek, "Evaluating Color Descriptors for Object and Scene Recognition", IEEE Trans. on Pattern Analysis and Machine Intelligence, 2010); 4) Hue: The hue was proven to be successful in several computer vision application. However, since the hue of a pixel becomes unstable near the grey axis, it is weighted by its saturation. This representation theoretically combines the two invariant properties of the rg and Opponent colorspaces; 5) Transformed RGB: the Red-Green-Blue channel values, but where their means have been subtracted and their variances normalized, to obtain zero-mean, unit-variance distributions, and 6) CIELab: This colorspace is a non-linear transformation of the RGB values, taking the illuminant into account. Its main advantage is its perceptual uniformity: a notable difference in color (as noted by the human eye) is proportional to the Euclidean distance. From the above, the normalized RGB (rg) and the weighted hue may be preferable, from which the rg colorspace is the more preferable one.

Once an image (image data) has been transformed to the selected colorspace, local histograms are built for each color component by considering some region-of-interest (ROI) around interest points. The different parameters to be considered with this approach are the number of bins in the histogram, as well as the area covered by the ROI:

The number of bins represents the accuracy with which a particular ROI is described. If the number of bins is too small, a coarse description with weak discriminating power is obtained. On the other hand, a large descriptor may become more sensitive to small variations, and can carry misleading information. Preferably, a number of bins in the histogram of 8 or 16 can be chosen. However, more bins also mean more computing time, and hence dealing with a compact representation can be a preferable trade-off between efficiency and accuracy.

The size of the local area to be considered in order to build the descriptor can also be of interest. Indeed, having a too small ROI would not carry enough discrimination, while a larger area would capture too much information and make the descriptor less discriminative. Thus, in some embodiments, a square ROI is considered, where the free parameter is its side (length). Since the size of the ROI may not have much influence on the classification performance, it can make sense to use a relatively small ROI which reduces the computational time to build the corresponding histogram. There are, however, alternatives regarding the local descriptors. Actually, color histograms represent just one possible implementation that have limited invariance properties (to illumination, for instance).

An alternative method is an attempt to derive a simple descriptor: Calonder et al. proposed the so-called Binary Robust Independent Elementary Features (BRIEF) (see M. Calonder, V. Lepetit, C. Strecha, P. Fua, "BRIEF: Binary Robust Independent Elementary Features" European Conference on Computer Vision, 2010). This descriptor represents an image patch as a bit string encoding the difference between randomly selected pairs of pixels.

Again with reference to FIG. 3, the extraction of the feature vector 320 (image signatures) is now described. When local image features have been extracted from an image, they can be further processed to reach a single vector representation for one image. In possible embodiments, an approach based on concatenation, as well as the known Bag-of-Words (BoW) representation can be used:

Firstly, local feature concatenation is performed by concatenating descriptors extracted from the different keypoints to form one feature vector. Preferably, one image is not represented with a very high-dimensional feature vector as this could cause problems during the classification procedure, which may have implications on the number of interest points and/or the size of the descriptor being limited.

Further, the concept of the Bag-of-Words (BoW) representation comes from text classification. It consists in describing a text as a collection of words, irrelevant of their ordering and the grammar. Then, based on the words present in a given text and the number of their occurrences, the text could be assigned to one category. A typical example where this approach is used is in spam classification, since the "vocabulary" contained in spam emails is relatively well defined.

This concept can be also applied in computer vision, and more particularly to tasks such as image retrieval, scene classification or object recognition. In this case, so-called "visual words" are extracted from images, usually at salient locations. Then, a "vocabulary" is built by clustering visual words, where the size of the vocabulary (i.e. the number of clusters) is a free parameter. Finally, when an image has to be recognized, the frequency histogram representing the occurrences of each visual word is computed and compared against previously learned histograms.

One advantage of this representation is that it leads to feature vectors of fixed dimension (i.e. the vocabulary size) and thus does not depend on the number of local descriptors extracted from the image. As a consequence, it is not required to retrieve the same number of keypoints in each and every image. The BoW representation can thus yield better results than the simple concatenation, and can also be more computationally efficient when performing recognition. In general, the bigger the vocabulary, the more computational time is required, in both training and recognition. Hence, a small vocabulary size can be preferred.

Figure 4B:
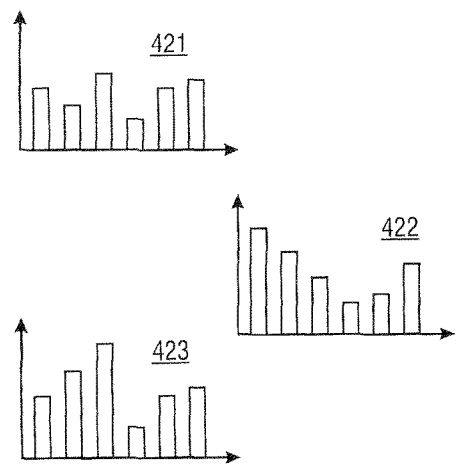
Figure 4C:
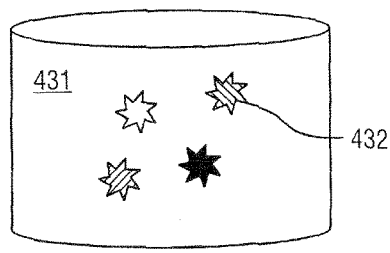
Figure 4D:
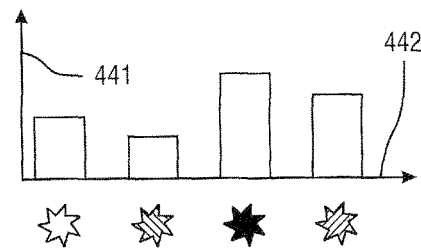

Now with reference to FIG. 4C, a vocabulary 431 is shown to comprise four different words 432, and FIG. 4D shows a corresponding histogram for one image. More specifically, the x-axis 442 is FIG. 4D indicates the different words 432 within the vocabulary 431. The y-axis 441 indicates the number (frequency) with which a word appears in the image data 310. The frequency of the words is the final feature vector in this embodiment.

In general, the Bag-of-Words (BoW) representation can perform better than the concatenation of local descriptors, but may also be more complex: Indeed, it requires building the vocabulary before each training phase of the SVM (support vector machine), and also building the histogram of visual word occurrences. The main advantage of this approach is its flexibility as the number of points should not necessarily be identical for all images. The vocabulary size and the dimension of the feature vector can be both tuned to the speed requirements of a given application.

Now with reference to FIG. 3, a classifier 330 is built after feature vectors 320 have been extracted from image data 310. The classifier may be built by a training process using extracted feature vectors. The classification/recognition may be performed based on an SVM, which is a machine learning algorithm (see for example C. Cortes and V. Vapnik, "Support-Vector Networks", Machine Learning, 20, 1995). The SVM is suitable for a various classification problems, such as text classification, object recognition and speech processing for instance.

Figure 5A:
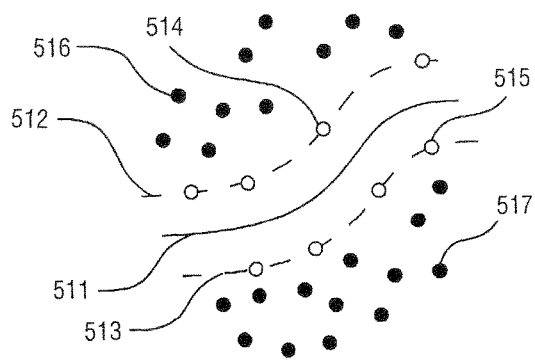
FIGS. 5A and 5B each show a schematic view of an exemplary planar vector space according to an embodiment of the present invention.

In general, SVMs are preferable discriminative classifiers. Its basic idea is to find the "best" separating boundary between data points coming from two different classes. Hence it is intrinsically meant to address two-class problems, as illustrated in FIG. 5A. that shows two sets of points (feature vectors in a two-dimensional plane). The two sets indicate two distinct classes. A first set is represented by points 514, 516 and a second set is represented by points 515, 517. The SVM calculates the optimal boundary 511 between the two sets. This boundary is represented by a decision functions. Points 514 and 515 located on the margin lines 512, 513 are called support vectors.

Figure 5B:
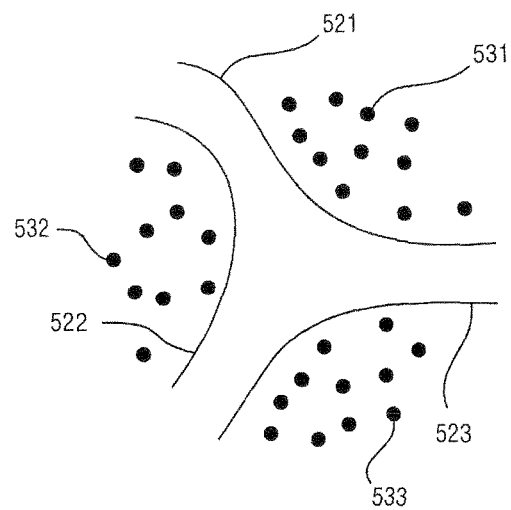

In the present embodiments, this algorithm can be applied on a multi-class problem, since usually more than two classes need to be considered (e.g. when more than two brands are produced on the same line). Such a multi-class problem is shown in FIG. 5B which shows three sets of points indicating three classes. A first set is represented by points 531, a second set is represented by points 532, and a third set is represented by points 533. The multi-class problem lies in finding boundaries 521, 522, and 523 that optimally separate the three sets.

In general, however, one may consider n different classes. Then, a possible way forward is building pairwise classifiers for each possible pairs, resulting in n(n−1)/2 binary classifiers. When an image is to be recognized, all the classifiers are tested, and a majority voting procedure is applied. Finally, the assigned class is the one obtaining the highest number of votes. However, each image needs to be processed with n(n−1)/2 classifiers, which may require some computational time. Besides, the voting strategy is not guaranteed to be reliable, especially when an equality in the number of votes occurs. In any way, other approaches to adapt SVMs to multiclass problems exist including the one-vs-all approach, the direct multiclass formulation and the probability formulation.

In the case of the one-vs-all multiclass formulation, a binary SVM model is trained for each class. Positive examples are the ones belonging to the class, and negative examples are the ones belonging to all other classes. In this case, there are n SVM models and thus n decision functions. The classification is made by taking the decision function yielding the highest score. Such an approach may have several advantages: First, the training and testing procedures can be easier and faster: only n models are considered. So, the classification process is decreased by an order of magnitude. Secondly, it may perform well when handling a larger number of classes, since this approach does not rely on the voting strategy, which is likely to become less precise as the number of classes increases.

Usually, the performance will depend on the problem at hand, and particularly on the number of classes to handle (see for example K. Duan & S. Sathiya Keerthi, "Which is the best multiclass SVM method? An empirical study", Workshop on Multiple Classifier Systems, 2005). There also exists a direct formulation to solve multiclass problems, described by Crammer and Singer in (see for example K. Crammer and Y. Singer. "On the Algorithmic Implementation of Multi-class SVMs", Journal of Machine Learning Research, 2001).

There exists also a probability formulation of the multi-class problem. When classifying objects, it could be useful to have a confidence measure on the classification. Furthermore, such a measure allows other products/objects to be suggested in case of doubts. For this purpose, the SVM framework can be extended to deal with probabilities (see for example T. F. Wu, C. J. Lin, and R. C. Weng, "Probability estimates for multi-class classification by pairwise coupling". Journal of Machine Learning Research, 2004). In a multiclass problem, the classifier can output the class probability for each product (soft decision), instead of providing the class label only (hard decision). The training procedure can be modified and a parametric function defining the posterior probability given the data is also learned. Classification is performed based on the (pairwise) classification scores and probabilities, to yield a global probability estimate for each class. The classification is finally made by assigning the label with the highest probability.

FIG. 4B shows the output of a classifier that uses the probability formulation of the multi-cell problem. Especially, FIG. 4B shows probability distributions for three different objects. Each probability distribution shows six probability values (corresponding to six classes) indicating a probability that the object belongs to the class.

In summary, the probability formulation allows for the provision of a figure on confidence of the recognition, which, in turn, provides useful information to detect unknown products, as explained in the following.

When system embodiments are in place, it can be considered that the production of a batch of unregistered products is launched so that suddenly objects of another class appear. These products/objects are not known by the classifier and thus could not be identified. In this case, the system can be able to detect that the product has not been learned (i.e. detect an "unknown" object). In other words, the system can be able to determine whether the object does not belong to any one of the set of classes. However, a conventional SVM classifier is designed such that it will always assign a class to such products.

Figure 7A:
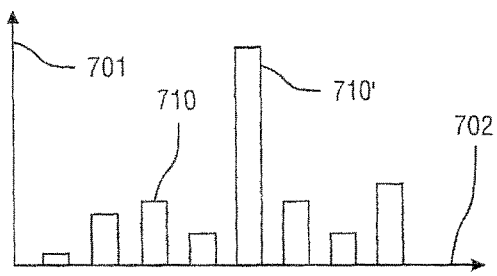
FIGS. 7A and 7B show schematic views of probability distributions according to an embodiment of the present invention.

Embodiments of the present invention consider using SVM with probabilities output. By analyzing the distribution of the class probabilities, it is possible to detect products that have not been learned by the system. In general, there are two possibilities: The first possibility is that the product has been learned, hence the class probability distribution should be high at the product's class value and low everywhere else, as depicted in FIG. 7A. The second possibility is that the product has not been learned, and thus the class probability distribution should more resemble to a uniform distribution, as depicted in FIG. 7B.

Figure 7B:
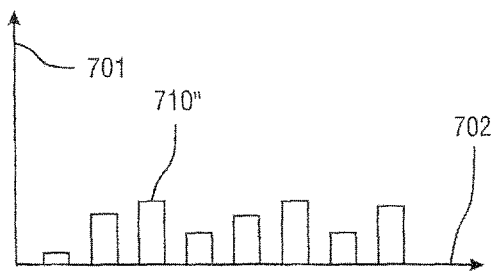

More specifically, FIGS. 7A and 7B show schematic views of probability distributions according to an embodiment of the present invention. The x-axis indicates different classes of a classifier. The y-axis indicates probability values. Especially, each probability value indicates whether an input feature vector (or object) belongs to one class. FIG. 7A shows the case where an object can be assigned to a class. The probability 710' is much larger than the other probabilities 710. Therefore, it can be determined that the object belongs to the class represented by the bin 710. On the other hand, FIG. 7B shows a probability distribution belonging to an unknown object. Especially, none of the probabilities 710" sticks out.

Along one embodiment, the probability distributions are evaluated using a threshold probability. If there is a probability value in the probability distribution for the object that lies above the threshold, it is determined that the object belongs to one class out of the set of classes of the classifier. Likewise, if all probabilities lie below the threshold, it is determined that the object does not belong to any one of the set of classes. However, several other approaches can be used in the present embodiment to further analyze the class probability distributions in order to detect an unknown object. In general, some given probability distribution is compared to the two ideal cases (i.e. deterministic in the case of a known product, and uniform otherwise).

Possible approaches could be divided in three categories: 1) Distances between distributions (Bhattacharyya and Chi-square); 2) Hypothesis testing (Kolmogorov-Smirnov and Cramer-von-Mises tests); and 3) Information related (entropy). Preferably, the analysis of the distribution is made by computing its entropy which is defined as a measure of the uncertainty associated with a random variable. Mathematically, it is expressed as:

$$-\sum_{i=1}^{n} p(x_i) \log p(x_i)$$

where $p(x_i)$ denotes the probability for class i. For discrete variables, the entropy is maximized when the distribution is uniform, and equal to zero when the distribution is deterministic.

In embodiments of the present invention, the entropy corresponding to the distribution of a known class should be low, whereas the entropy of the distribution of an unknown class should be higher. Using this information, it is then possible to detect if the class is unknown by setting a threshold on the entropy of the class probability distribution output by the SVM.

In general, however, detection of unknown objects based either directly on the probability distribution or based on the entropy approach may employ the definition of a threshold. According to one embodiment, the threshold may be defined using a quality indicator. The quality indicator may show the reliability of the classifier:

When building a classifier, it can be considered to somehow monitor the training process, e.g. to have an idea if the classifier has been built properly and what kind of performance could be expected. Indeed, it could happen that the training phase results in a suboptimal classifier, mainly due to external factors, such as singular illumination conditions, degraded acquisition conditions (blur, dust) or bad definition of the Region-Of-Interest (ROI) in the image. For this purpose, it would be convenient to have a measure on the expected performance of the classifier.

Such s training accuracy, e.g. a recognition rate computed on the images used to build the classifier, can be provided to a user. However, this measure can be highly biased since SVMs usually find the global optimum for the problem at hand. In other words, it is likely that the training error will be zero, which may result in overfitting: the classifier is too close to the training data, and then will have poor generalization ability on unseen data. Hence, it does not reflect the real (expected) accuracy.

One way for computing such an estimate is the so-called cross-validation. Usually in machine learning, classifiers are designed using at least two distinct datasets: a training (learning) set used to learn the model, and a so-called validation (test) set to evaluate the training and optimize results (by tuning some parameters for instance). In an embodiment, a validation set is not available a priori; hence performance measure cannot be acquired before running the system. However and since training data could be gathered, the principle of cross-validation could be easily applied by 1) dividing the training set into k subsets; 2) training the classifier using k−1 subsets (learning image data); 3) testing the classifier on the remaining subset (test image data), and record the performance; 4) repeating the procedure with the different combinations of training/testing subsets.

Figure 6:
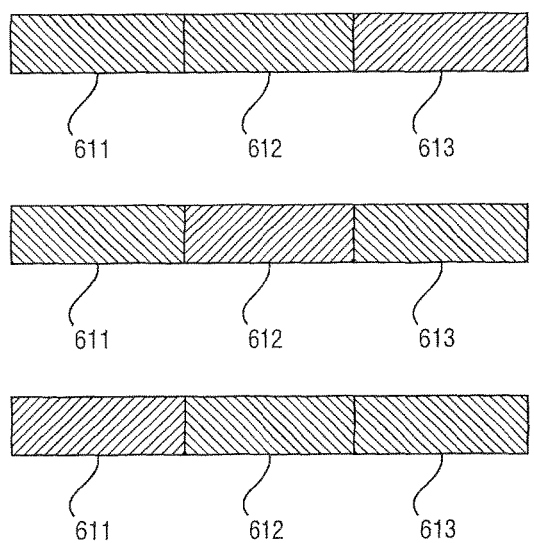
FIG. 6 shows a schematic view of template image data, learning image data, and test image data according to an embodiment of the present invention.

FIG. 6 shows a schematic view of template image data, learning image data, and test image data according to an embodiment of the present invention. Especially, FIG. 6 shows an example where the template image data is divided in three subset (k=3). In the top case in FIG. 6, the subsets 611 and 612 are the learning data and the subset 613 is the test image data. In the middle case in FIG. 6, the subsets 611 and 613 are the learning data and the subset 612 is the test image data. In the bottom case in FIG. 6, the subsets 612 and 613 are the learning data and the subset 611 is the test image data.

Using the above procedure, a confusion matrix 340 (see FIG. 3) can be calculated. In the example of FIG. 3, the classifier contains three classes (corresponding to the objects in FIG. 2). The entries $a_{ij}$ of the confusion matrix indicate the averaged probability of classifying an object of type i into a class j. The averaged probability is calculated by averaging the probabilities of the various test runs. The probability threshold may be defined as the smaller diagonal entry in the confusion matrix 340, i.e. as the smallest $a_{ii}$. In any case, however, it is not necessary to compute all matrix elements as only one or more diagonal elements may be of interest as a threshold.

In general, overall recognition performance may decrease when some products are not learned a priori by the classifier. Actually, performing unknown products detection introduces two new kinds of errors in addition to the classification error: the false unknown detection (i.e. a learned product is said to be unknown) and the missed unknown (i.e. a known product is assigned to an unknown product). Hence, a new kind of classification problem may arise in open set scenarios. Further, the detection of unknown products/objects is highly dependent on the products that have been learned, and the ones that have not. Indeed, if an unknown product is "visually close" to one within the already learned products, it is more likely to be confusing.

Figure 8:
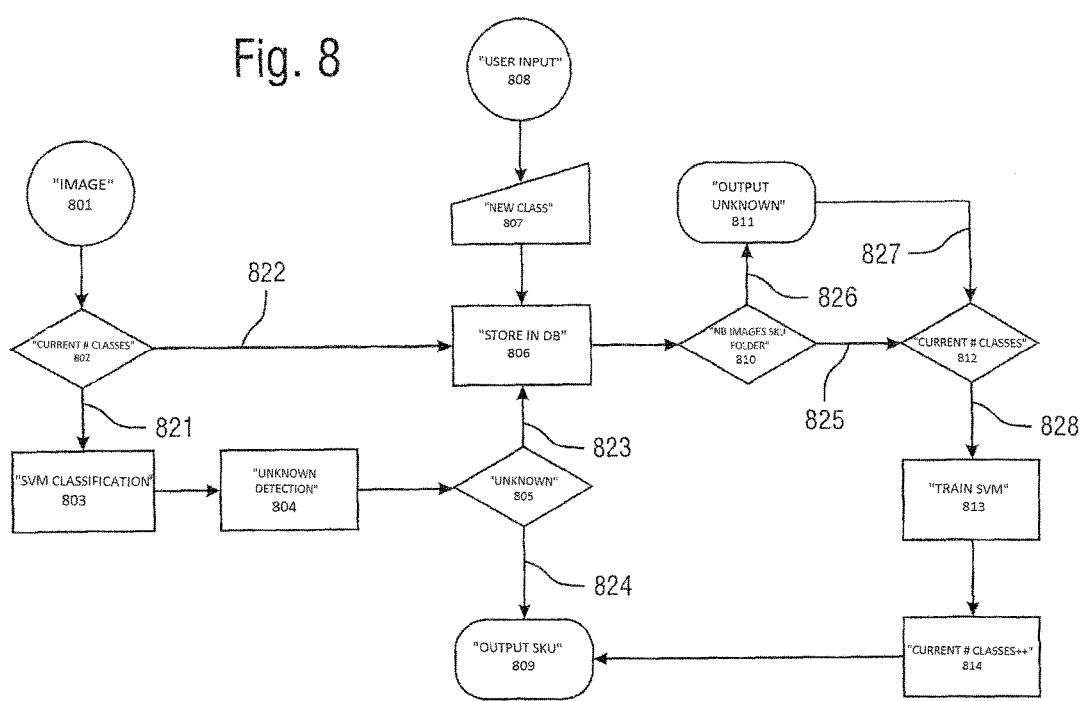
FIG. 8 shows a schematic flowchart of a method embodiment of the present invention.

FIG. 8 shows a schematic flowchart of a method embodiment of the present invention. Once the classifier has been built, recognition of the following images is performed as if they were appearing on the production line, including the mechanism to detect unknown products. Each time an unknown product is automatically detected on the production line, a user is prompted to enter the new product (object), and the image is saved for further training. When a sufficient number of images has been collected for this new product, the classifier is retrained with the additional class, and normal recognition takes place again. Note that on a real production line, the retraining phase of the classifier is done in parallel to the recognition, hence without interfering with the production.

More specifically, the process starts in step 801 ("IMAGE") by obtaining image data comprising an image of an object. This can be performed by the image acquisition means 101. In a following step 802 ("CURRENT # CLASSES"), the current number of classes in the classifier is counted. If the number of classes is smaller than two (822: "<2"), the process proceeds to step 806 ("STORE IN DB"). In step 806, the obtained image data is stored in a database in the memory unit 103.

If the number of classes is smaller larger or equal to two (821: "≥2"), the process proceeds to step 803 ("SVM CLASSIFICATION"). In step 803, a feature vector is extracted from the image data and input into the classifier. The output of the classifier is used in step 804 ("UNKNOWN DETECTION") to perform an unknown object detection. In the following step 805 ("UNKOWN") it is determined whether the object does not belong to any one of the set of classes, i.e. is unknown. if the object is known (824: "NO"), the procedure proceeds to step 809 ("OUTPUT SKU") in which the stock keeping unit of the object is output.

If the object is unknown (823: "YES"), the procedure proceeds to step 806, in which the image data of the unknown object is stored in the database. Furthermore, if the object is unknown, a user input 808 ("USER INPUT") is requested. The user input indicates a new class 807 ("NEW CLASS")(e.g. a SKU) to which the unknown object belongs.

After the unknown object has been saved is the database, the procedure proceeds to step 810 ("NB IMAGES SKU FOLDER"). In step 810, the number of unknown objects stored in the database is counted. If the number is smaller than 50 (826: "<50"), the unknown objects are outputted (step 811: "OUTPUT UNKNOWN").

If the number is larger or equal to 50 (825: "≥50"), the procedure proceeds to step 812 ("CURRENT # CLASSES"). In step 812, the current number of classes of the classifier is counted. If the current number is smaller than two (827: "<2"), the procedure proceeds to step 811. If the current number is larger of equal to 2, the procedure proceeds to step 813 ("TRAIN SVM"). In step 813, the SVM is trained with the new class. Then the procedure proceeds to step 814 ("CURRENT # CLASSES++") in which the current number of classes is increased by one. After step 814 the procedure proceeds to step 809, in which the SKU of the new class is output.

Figure 9:
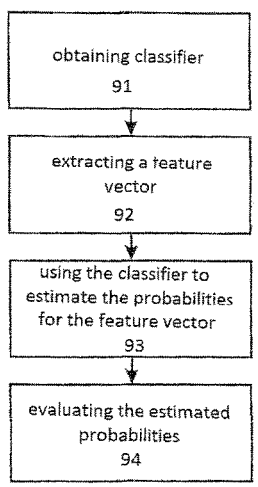
FIG. 9 shows a schematic flowchart of another method embodiment of the present invention.

FIG. 9 shows a schematic flowchart of another method embodiment of the present invention. Such method embodiments classify an object in image data to one out of a set of classes using a classifier, wherein the image data comprises an image of the object and each class indicates a property common to a group of objects. Specifically, method embodiments comprise a step 91 of obtaining said classifier used to estimate for an input feature vector a probability for each of the set of classes, one probability indicating whether the input feature vector belongs to one class, a step of extracting a feature vector from said image data, a step 93 of using the obtained classifier to estimate the probabilities for the extracted feature vector, and a step 94 of evaluating the estimated probabilities for determining whether the object does not belong to any one of the set of classes based using a quality indicator.

Figure 10:
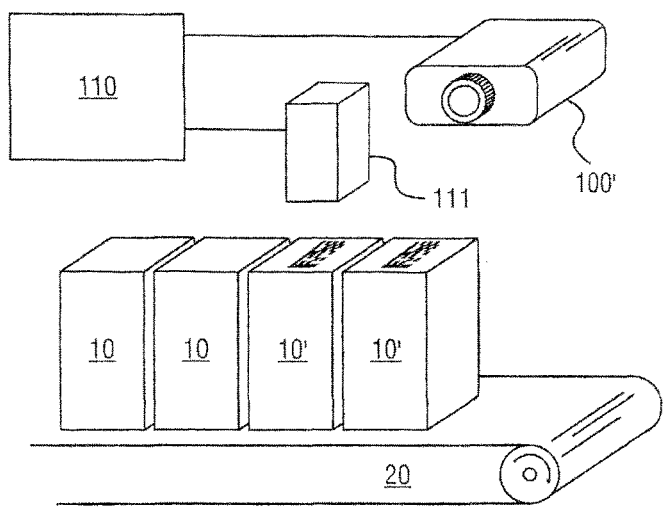
FIG. 10 shows an application environment according to an embodiment of the present invention.

FIG. 10 shows an application environment according to an embodiment of the present invention. Specifically, unmarked objects 10 move along a line 20 for being marked by a printer 111. The marked objects 10' accordingly feature a mark in the exemplary form of a two-dimensional bar code. The printer 111 is coupled to a data management system 110. One possible application example as shown in conjunction with FIG. 10 is a method and system for verifying tax declarations of taxable goods. This system can be integrated in high-speed production lines of which the line 20 only represents one part. The data management system can provide some sort of unique identifier (number, code, etc.) that can be applied to a product (object), e.g. by printing a two-dimensional bar code or a data matrix code by means of printer 111.

A camera 100' can acquire an image of the marked product 10'. By use of embodiments of the present invention, the object 10' is identified and classified (i.e. by using computer vision algorithms, SVM classifiers, and related concepts). If the class of the product is not part of the registered products by the manufacturer, then the product item can be classified as unknown, i.e. it can be determined that it does not belong to the (recent) set of classes. Camera 100' may thus be a device for classifying objects according to an embodiment of the present invention.

The applied identification on marked products 10' may carry manufacturing data related to the manufacturer, to a production date, brand, tax class, etc. This information may in turn allow for detection of tax fraud. To achieve a fast and accurate tax recovery, the data management system 110 can be configured to compare the manufacturing data linked to the tax declarations with the identified class obtained by camera/device 100'. For example, if the manufacturing data indicates some size or amount of taxable good (e.g. 20 cigarettes), but the classification by camera/device 100' indicates deviating information (e.g. 40 cigarettes), discovery of tax fraud can be achieved. The systems and methods described herein are non-intrusive and can be easily integrated into existing manufacturing and distribution operations without slowing-down high-speed production lines.

Figure 11:
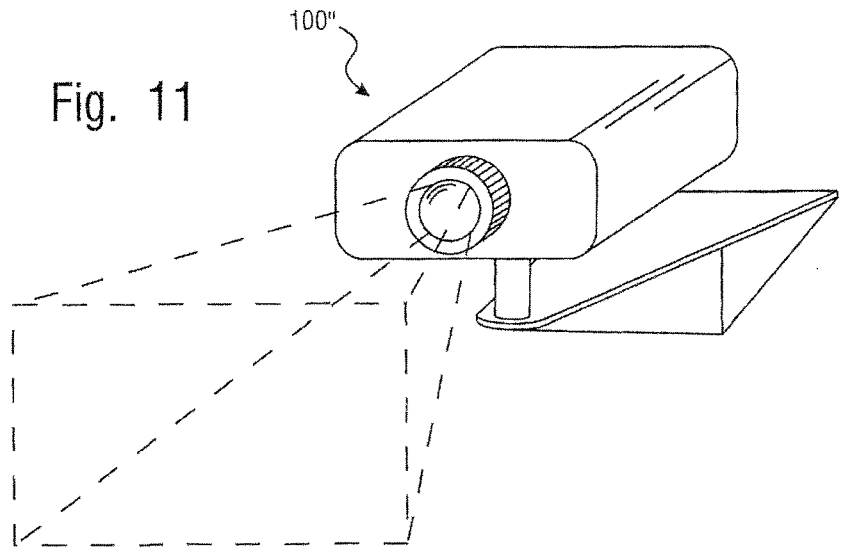
FIG. 11 shows a device embodiment of the present invention.

FIG. 11 shows a device embodiment of the present invention. Specifically, a fixed type embodiment of a device 100" is shown for classifying an object in image data, to one of a set of classes using a classifier, wherein the image data comprising an image of the object and each class indicates a property common to a group of objects. The device 100" comprises processing resources being configured to obtain said image data, obtain said classifier used to estimate for an input feature vector a probability for each of the set of classes, one probability indicating whether the input feature vector belongs to one class, extract a feature vector from said image data, use the obtained classifier to estimate the probabilities for the extracted feature vector, and to evaluate the estimated probabilities for determining whether the object does not belong to any one of the set of classes based using a quality indicator.

For example, device 100" is a module operable to be mounted on a production/packaging line for classifying, counting, identifying and/or authenticating objects transported on the line. Apparatus 100" comprises a window through which a digital image of an object can be acquired. The apparatus 100" may further comprise an integrated processing unit (not shown) for performing one or more method of embodiments of the present invention. An additional fixation element may be provided for mounting the apparatus 100" on, for example, a production line in which a plurality of objects pass for classification. The device may, of course, take other forms and may be wire-bound or wireless.

Although detailed embodiments have been described, these only serve to provide a better understanding of the invention defined by the independent claims, and are not to be seen as limiting.

The invention claimed is:

1. A method for classifying an object in image data to one out of a set of classes using a classifier, said image data comprising an image of the object, the method comprising:
    extracting a feature vector from said image data;
    separating template image data into learning image data and into test image data, and extracting feature vectors from the learning image data and from the test image data;
    obtaining a classifier based on the feature vectors extracted from the learning image data;
    using the obtained classifier to estimate probabilities for the extracted feature vector to belong to each class of the set of classes;
    evaluating the estimated probabilities for determining whether the object does not belong to any one of the set of classes, wherein it is determined that the object does not belong to any one of the set of classes if all estimated probabilities lie below a threshold probability, wherein the threshold probability is obtained from testing the classifier with the feature vectors extracted from the test image data, including calculating diagonal entries of a corresponding confusion matrix, and selecting a smallest of the calculated diagonal entries as the threshold probability.

2. The method of claim 1, wherein the classifier is generated using a support vector machine.

3. The method of claim 1, further comprising adding a new class to the set of classes if it is determined that the object does not belong to any one of the set of classes.

4. The method of claim 1, further comprising counting a classified object.

5. The method of claim 1, further comprising authenticating a classified object.

6. A device for classifying an object in image data, to one of a set of classes using a classifier, said image data comprising an image of the object, the device comprising a processor coupled to a memory configured to:
- obtain said image data;
- extracting a feature vector from said image data;
- separate template image data into learning image data and into test image data, and extract feature vectors from the learning image data and from the test image data;
- obtain a classifier based on the feature vectors extracted from the learning image data;
- use the obtained classifier to estimate probabilities for the extracted feature vector to belong to each class of the set of classes;
- evaluate the estimated probabilities for determining whether the object does not belong to any one of the set of classes, wherein it is determined that the object does not belong to any one of the set of classes if all estimated probabilities lie below a threshold probability, wherein the threshold probability is obtained from testing the classifier with the feature vectors extracted from the test image data, including calculating diagonal entries of a corresponding confusion matrix, and selecting a smallest of the calculated diagonal entries as the threshold probability.

7. The device of claim 6, wherein said processor is configured to implement a method that includes generating the classifier via a support vector machine.

8. The device of claim 6, wherein the device further comprises an image acquiring device for acquiring said image data.

9. A computer program stored on a non-transitory computer-readable medium, comprising code executable by a computer processor to perform the method of claim 1.

10. A computer program product comprising a tangible and non-transitory data carrier storing in a non-volatile manner the computer program of claim 9.

11. A system comprising:
- a conveyor line arranged for moving objects through a field of view;
- the device of claim 6; and
- an image acquiring device arranged for acquiring said image data comprising an image of said field of view.

12. The system of claim 11, wherein the conveyor line is any one of a conveyor belt, conveyor chain, guiding rail, sliding track, and transport track.

* * * * *